Jan. 29, 1963  L. R. SHEPPARD  3,075,390
TEMPERATURE COMPENSATING CONNECTING LINKAGE
Filed June 18, 1959  2 Sheets-Sheet 1

INVENTOR
Leonard R. Sheppard
BY
Pollard Johnston Smythe & Robertson
ATTORNEYS

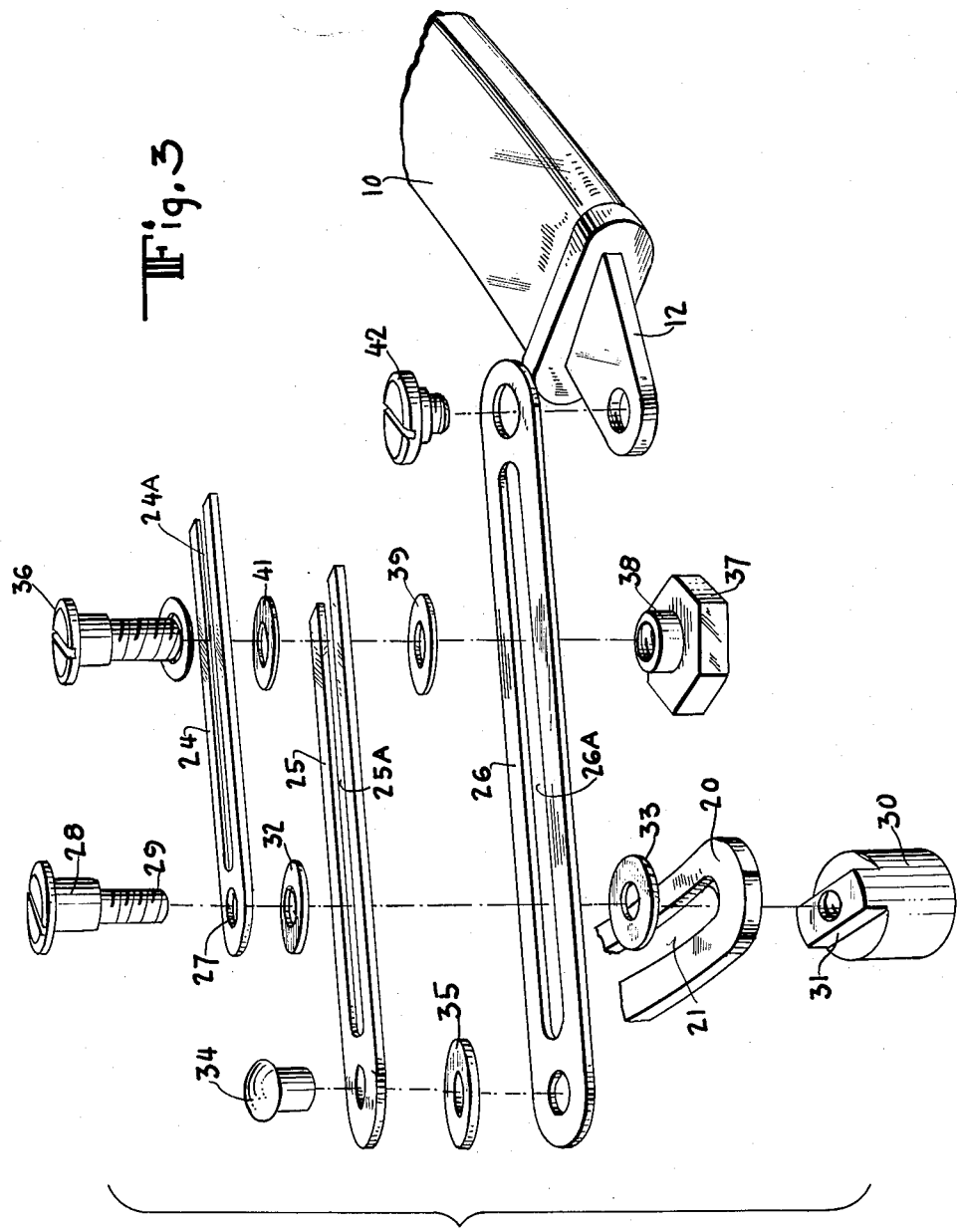

United States Patent Office 3,075,390
Patented Jan. 29, 1963

3,075,390
TEMPERATURE COMPENSATING CONNECTING LINKAGE
Leonard R. Sheppard, Yardley, Pa., assignor to Ametek, Inc., New York, N.Y., a corporation of Delaware
Filed June 18, 1959, Ser. No. 821,260
6 Claims. (Cl. 73—393)

This invention relates to pressure gauges and particularly to a means for compensating for ambient temperature variations.

When a gauge is subjected to an ambient temperature different from that for which it was calibrated, such will cause linear expansion or contraction of various parts thereof so as to produce erroneous readings. Another source of error is a change in spring rate with temperature of the Bourdon tube or condition responsive means. Prior devices have had various types of bimetallic compensating links or links having flexible parts for overcoming errors due to ambient temperatures. Also, in many instances, the link has been in the form of a bowed element joining the condition or pressure responsive means and the pointer or indicator mechanism. These have not been completely satisfactory. As an example, in the case of overpressure, where a segment stop is used, the link will be deformed and damage may be done to it or other parts of the instrument. Further, prior links have not been readily adjustable nor adjustable without affecting the distance between the segment and tube tip.

One of the objects of the invention is to provide an indicating instrument having a readily adjustable compensating link arrangement and which can be adjusted without affecting the relation between the indicator and sensitive element.

A further object of the invention is to provide a temperature compensated instrument with a compensating means, which will not be damaged by overpressure.

In one aspect of the invention a pressure responsive means, such as a Bourdon tube, is employed to operate an amplifying linkage means such as a segment for actuating an indicator such as a pointer or the like. In order to eliminate errors due to spring rate change with temperature, it is preferable to use a Bourdon tube made of a material which has substantially constant spring qualities regardless of temperature changes. An example of such material is metal sold under the name of "Ni-Span-C." The Bourdon tube has a tip which is connected to the amplifying linkage of the gauge through a temperature compensating link means. The link means of the invention includes a plurality of elements in the form of relatively rigid bars arranged in side-by-side relation. The bars are of material selected so that there will be a differential movement or longitudinal expansion and contraction therebetween upon ambient temperature change. As an example, one bar may be of the metal known as "Invar" which has substantially no change in dimension with temperature, and another of the bars may be of aluminum which has a relatively high coefficient of expansion. The metal or material of which each of the bars is made can be suitably chosen. Negative or positive differential movement can be obtained. In one form, at least three bars are used although more can be employed. The Bourdon tube tip is connected adjacent to the end of one bar. At a point spaced from the tip connection, the first bar or bottom link is connected to the second bar or middle link. The third bar or top link is connected to the second bar at a point spaced from where the first bar is connected to the second bar, the third bar being connected to the amplifying linkage end. The connection between the second and third bar preferably is adjustable. Thus, the compensating link assembly will axially change dimension along the longitudinal axis or effective longitudinal axis of the bars thereof. Further, the bars will be relatively rigid so that they will not bend.

As temperature changes occur, the constant spring rate or constant coefficient of thermoelasticity of the Bourdon tube will eliminate errors from this cause. The shift of the zero point due to expansion of gauge parts will be compensated for by the change of length of the link assembly. The materials of the assembly are arranged so as to obtain the desired correction in a limited length or space and in the desired direction. The effective length and thus the rate of compensation of the bars can be adjusted by shifting the position of the action of the connection of the second bar to the third bar, relative to each other without changing the distance between the connection with the segment tail and the Bourdon tube tip. Also, the assembly can be used where various distances are involved. For example, the distance between tip and segment connection can be adjusted to suit the specific gauge size and design and then minor adjustments can be made to effect linearity or scale shape. Any of these adjustments will alter the thermal compensation which then can be adjusted as needed. Further, the links do not necessarily have to be straight. By increasing the number of links, it is possible to increase considerably the amount of thermal compensation. This is desirable when space is limited. These and other objects, advantages and features of the invention will become apparent from the following description and drawings which are merely exemplary.

In the drawings:

FIG. 3 is an exploded view showing in detail the various elements of the compensator link or temperature compensator.

Figure 1:
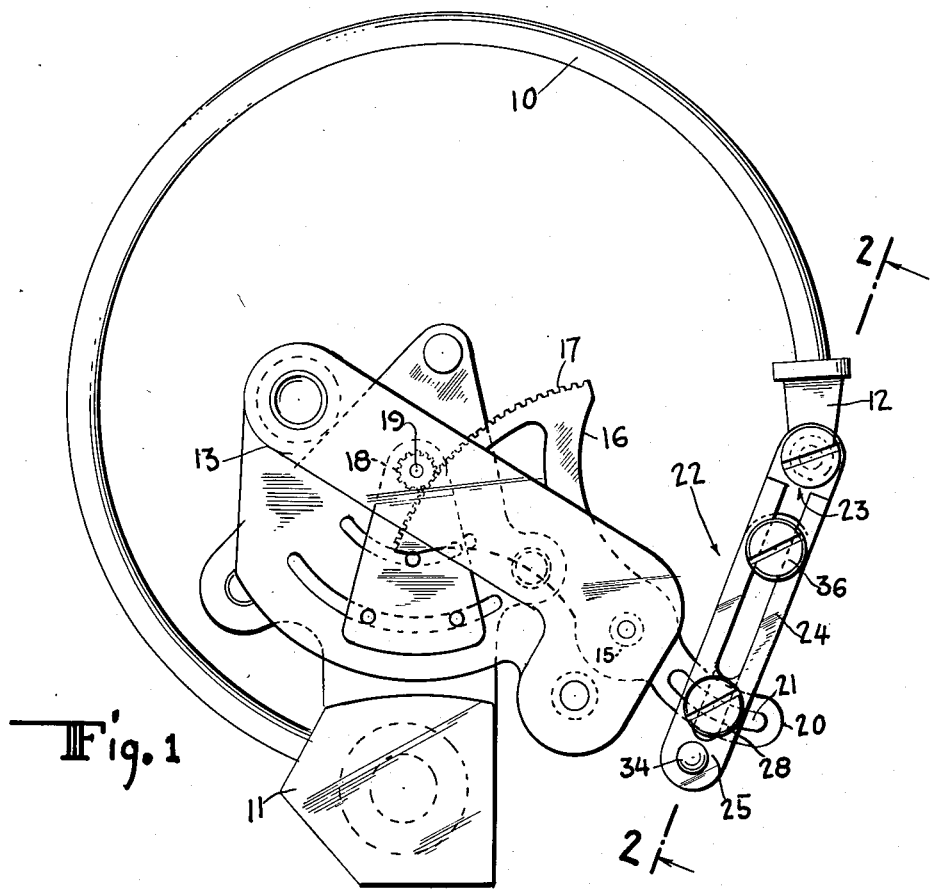
FIG. 1 is a fragmentary view of the working parts of a gauge to which the invention can be applied.
Figure 2:
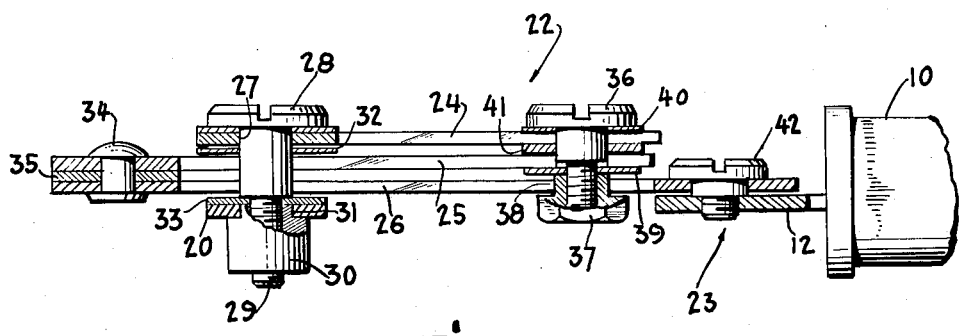
FIG. 2 is an enlarged view taken along the line 2—2 of FIG. 1.

The invention will be described specifically in conjunction with a pressure operated gauge employing a Bourdon tube, but can be used for other purposes. Bourdon tube or spring 10 (FIG. 1) is mounted in socket 11 in the usual manner, said tube having conventional tip 12. Socket 11 may have a movement frame 13 mounted thereon, said movement supporting pivot 15 of segment 16. An example of such a movement can be seen in U.S. Patent 2,821,855. The amplifying linkage may include a segment or sector 16 having teeth 17 meshing with pinion 18 for turning pointer shaft 19. A pointer, other indicator, or read-out means (not shown) can be mounted on the pinion shaft. Tail 20 of segment 16 has a slot 21 for adjustably receiving one end of the compensator link means generally indicated at 22. Tip 12 has a connecting means at 23 for connecting the compensator link assembly to the tip 12 of Bourdon tube 10.

A preferred metal for the Bourdon tube or pressure sensitive element is one consisting essentially of nickel, iron, chromium and titanium. The preferred composition is 41–43% nickel, 2.2–2.6% titanium, 5.1–5.7% chromium, maximum carbon 0.06%, manganese 0.3–0.6%, silver 0.3–0.6%, aluminum 0.4–0.8%, and the balance of iron. Such is a precipitation hardenable alloy.

The temperature compensator link assembly 22 is composed of a plurality of relatively rigid bars arranged in side-by-side relation. As an example of a suitbale construction, the top link 24 may be made of "Invar" or "Inconel" or other metal or material having a low coefficient of expansion. The mid-link or bar 25 may, for example, be made of aluminum or similar material having a relatively higher coefficient of expansion as compared to that of the top link. The bottom link 26 may also be made of "Invar" or material having a relatively low coefficient of expansion.

In the specific arrangement shown in the drawings, top link 24 has aperture 27 for receiving shoulder segment screw 28. The screw threaded end 29 thereof is engageable by segment nut 30 having a flattened portion 31, said flattened portion being engageable in slot 21 of segment 20. Washer 32 is inserted between the top and mid-link so that the top link can move relative to the mid-link at the end adjacent segment screw 28. The parts are dimensioned so that when nut 30 is tightened, the top link will be connected to segment 20, the other links being slidable relative to shoulder screw 28 which passes through slots 25A and 26A of mid- and bottom links 25 and 26, respectively. The mid-link 25 is connected to the bottom link 26 by means of a rivet 34, there being a washer 35 between the bottom and mid-links for spacing purposes.

The top link is connected to the mid-link by means of shoulder screw 36 and shoulder nut 37, the shoulder 38 of nut 37 being arranged to bear against washer 39 so that when the nut 37 is tightened, washer 39 will grip mid-link 25 between it and washer 40 on top of the top link 24. Washer 41 is a spacer washer. The parts are dimensioned such that when nut 37 is tightened, top link 24 will be joined to mid-link 25 along the axis of screw 36, the nut 37 being slidable relative to bottom link 26 in slot 26A thereof. Bottom link 26, which is slidable relative to the axis of screws 28 and 36, is connected by screw 42 to tip 12 of Bourdon tube 10.

Movement of tip 12 will be transmitted to segment 20 through screw 42, bottom link 26, rivet 34, mid-link 25, screw 36, top link 24 and screw 28. Using the materials previously described, as the temperature increases, the length of links 24 and 26 will stay substantially constant but the length of mid-link 25 will increase. Thus, the distance between the axis of screw 36 and rivet 34 will increase along the longitudinal axis of the compensator so that the effective length between the segment and tip will decrease. As previously mentioned, the materials can be chosen so as to provide the desired dimension change and in the desired direction.

If it is desired to adjust the compensating characteristics or differential expansion, the length of the mid-link 25 relative to the others can be changed readily without changing the distance between the tip and segment. This can be accomplished by loosening nut 37 and sliding screw 36 and nut 37 in slots 24A, 25A and 26A to a location to provide the desired compensation. The compensating movement of the links relative to each other in the form shown is rectilinear and the assembly is relatively rigid. Further, if desired, the link assembly can be adjusted for the particular distance between the tip and segment connection and then the temperature compensation adjusted as needed.

In the preferred form, the links are in side-by-side relation but they could be arranged in extended relation (not shown) and means could be provided for connecting the links, said means being adjustable along the longitudinal axis of the links so as to adjust the differential expansion. Also, two or more links could be used. By "gauge" is meant a pressure responsive or similar instrument. A gauge with a conventional segment or other equivalent amplifying linkage can be employed. Further, other details of construction can be varied without departing from the spirit of the invention except as defined in the appended claims.

What is claimed is:

1. In a gauge having a pressure responsive means with a movable tip and amplifying linkage means for actuating an indicator, temperature compensating link means connecting the movable tip of said responsive means and said amplifying linkage means, said compensating link means including at least a pair of side-by-side relatively rigid longitudinally extending bars of different temperature coefficients of expansion the longitudinal axes of said bars being disposed in a predetermined relation to each other, means for connecting said bars to one another to selectively determine the effective length of each of said bars in the total effective length of said link means, said link means being effectually operably expansible and contractible only in the direction of the longitudinal axis thereof and means for maintaining said predetermined relation substantially constant during temperature changes.

2. In a gauge having a Bourdon tube with a movable tip, amplifying linkage means, and an indicator means connected to said amplifying linkage means, the combination including temperature compensating link means having three longitudinally extending bars, at least two of which have different relative coefficients of expansion, said bars having their longitudinal axes extending in side-by-side relation and being differentially expansible along their longitudinal axes, means connecting said tip to a first of said bars, means connecting a second of said bars to said first bar at a spaced point relative to the connection to said tip, means adjustably connecting said second bar to a third of said bars, means connecting said third of said bars to said amplifying linkage means, said connecting means selectively determining the effective length of each of said bars in the total effective length of said link means, and means for maintaining said side-by-side relation substantially constant during temperature changes, so that differential expansion of said bars relative to each other will assist in compensating for zero shift due to temperature change and adjustment can be made without changing the distance between said tip and amplifying linkage means.

3. In a gauge having amplifying linkage means, and an indicator means connected to said amplifying linkage means, the combination including a Bourdon tube having a movable tip, said Bourbon tube comprising a metal of a precipitation hardening alloy consisting essentially of nickel in the range of 41 to 43 percent, chromium in the range of 5.1 to 5.7 percent, titanium in the range of 2.2 to 2.6 percent, and iron, temperature compensating link means having three longitudinally extending bars, at least two of which have different relative coefficients of expansion, said bars having their longitudinal axes extending in side-by-side relation and being differentially expansible along their longitudinal axes, means connecting said tip to a first of said bars, means connecting a second of said bars to said first bar at a spaced point relative to the connection to said tip, means adjustably connecting said second bar to a third of said bars, means connecting the third of said bars to said amplifying linkage means, said connecting means selectively determining the effective length of each of said bars in the total effective length of said link means, and means for maintaining said side-by-side relation during temperature changes so that differential expansion of said bars relative to each other will assist in compensating for zero shift due to temperature change and adjustment can be made without changing the distance between said tip and amplifying linkage means.

4. In a gauge having a Bourdon tube with a movable tip, amplifying linkage means, and an indicator means connected to said amplifying linkage means, the combination including temperature compensating link means having three longitudinally extending bars with their longitudinal axes extending in side-by-side and folded separated relation, at least one of said bars having a different temperature coefficient of expansion than the others, said bars being differentially expansible along their longitudinal axes; means connecting said tip to a first of said bars, means connecting a second of said bars to said first bar at a spaced point relative to the connection to said tip, means adjustably connecting said second bar to a third of said bars, means connecting the third of said bars to said amplifying linkage means, said connecting means selectively determining the effective length of each of said bars in the total effective length of said link means, and means for maintaining said side-by-side relation substantially constant during temperature changes, so that differential expansion of said bars relative to each other will assist in compensating for zero shift due to temperature change.

5. In a gauge having a pressure responsive means, amplifying linkage means, an indicator means connected to said amplifying linkage means, the combination including temperature compensating link means assembly having a plurality of rigid bars held in side-by-side operative relation, at least one of said bars having a different temperature coefficient of expansion than the others, said bars being operatively expansible and contractible along their longitudinal axes, means connecting one of said bars to said responsive means, means connecting another of said bars to said amplifying linkage means, means adjustably connecting at least two of said bars to each other, said connecting means selectively determining the effective length of each of said bars in the total effective length of said link means, and means for maintaining said side-by-side relation substantially constant during temperature changes, said bars being operatively expansible and contractible to compensate for temperature change and being adjustable without changing the distance between the means connecting to the responsive means and to the amplifying linkage means.

6. In a gauge having a Bourbon tube with a movable tip, amplifying linkage means, and an indicator means connected to said amplifying linkage means, temperature compensating link means having three longitudinally extending bars with their longitudinal axes extending in side-by-side relation, at least one of said bars having a relatively high coefficient of expansion as compared to the other bars, said bars being differentially expansible along their longitudinal axes, means connecting said tip to a first of said bars, means connecting a second of said bars to said first bar at a spaced point relative to the connection to said tip, means adjustably connecting said second bar to a third of said bars, means connecting the third of said bars to said amplifying linkage means, said connecting means selectively determining the effective length of each of said bars in the total effective length of said link means, and means for maintaining said side-by-side relation substantially constant during temperature changes so that differential expansion of said bars along said longitudinal axes relative to each other will compensate for zero shift due to temperature change and adjustment can be made without changing the distance between said tip and amplifying linkage means.

References Cited in the file of this patent

UNITED STATES PATENTS

| | | |
|---|---|---|
| 1,760,878 | Martin | June 3, 1930 |
| 2,387,909 | Ingham | Oct. 30, 1945 |

OTHER REFERENCES

Article: "Thermal Compensator for Bourbon Gauges" by Otto W. Heise, Instruments and Automation, March 1958, page 473. (Photostat in 73–393.)